(12) United States Patent
Steckhan

(10) Patent No.: US 7,243,867 B2
(45) Date of Patent: Jul. 17, 2007

(54) COFFEE GRINDER WITH COFFEE BEAN CONTAINER

(75) Inventor: Markus Steckhan, Mulheim (DE)

(73) Assignee: WIK Far East, Ltd, Hong Kong (HK)

( * ) Notice: Subject to any disclaimer, the term of this patent is extended or adjusted under 35 U.S.C. 154(b) by 28 days.

(21) Appl. No.: 10/763,034

(22) Filed: Jan. 22, 2004

(65) Prior Publication Data
US 2005/0017107 A1 Jan. 27, 2005

(30) Foreign Application Priority Data
Jan. 22, 2003 (DE) .................. 203 00 933 U

(51) Int. Cl.
A47J 42/50 (2006.01)
A47J 42/38 (2006.01)
A47J 42/00 (2006.01)

(52) U.S. Cl. .................. 241/100; 241/34; 99/279; 99/286

(58) Field of Classification Search ................ 241/100; 99/286
See application file for complete search history.

(56) References Cited

U.S. PATENT DOCUMENTS

| 1,189,035 A | 6/1916 | Asbury et al. |
| 3,327,615 A | 6/1967 | Swam |
| 4,007,675 A | 2/1977 | Cailliot et al. |
| 4,555,984 A | 12/1985 | Yamashita |
| 4,624,177 A | 11/1986 | Ito et al. |
| 4,759,274 A * | 7/1988 | Schmidt ............. 99/295 |
| 5,058,814 A | 10/1991 | Ephraim et al. |
| 5,186,399 A | 2/1993 | Knepler et al. |
| 5,307,733 A | 5/1994 | Enomoto |
| 5,417,145 A | 5/1995 | Joseph, Jr. et al. |
| 5,458,295 A * | 10/1995 | Haber et al. ............ 241/100 |
| 5,913,961 A | 6/1999 | Chmiel et al. |
| 6,227,102 B1 | 5/2001 | Sham et al. |
| 6,339,985 B1 * | 1/2002 | Whitney ............. 99/286 |
| 6,708,599 B2 | 3/2004 | Torigai et al. |

FOREIGN PATENT DOCUMENTS

| DE | 26 41 539 | 2/1978 |
| DE | 36 08 940 | 9/1987 |
| DE | 690 08 302 | 8/1994 |
| DE | 203 00 933.9 | 7/2004 |
| EP | 1440642 B1 | 1/2004 |

* cited by examiner

Primary Examiner—Lowell A. Larson
Assistant Examiner—Jason Y. Pahng
(74) Attorney, Agent, or Firm—Margaret Polson; Patent Law Offices of Rick Martin, PC

(57) ABSTRACT

A coffee grinder with a coffee bean container 9 divided into at least two compartments 13, 14, with a bottom-side output shaft 20 common to both compartments 13, 14. The coffee bean container has a grinding mill 10 disposed beneath the output shaft 20 and a closure element 22 for the optional closing of the output 17, 18 of the compartment(s) 13, 14. The closure element 22 forms with the grinding mill 10 a concrete unit and the coffee bean container 9 is disposed rotatably relative to the unit formed of the closure element 22 and the grinding mill 10. Such a coffee bean container 9 could also be used on an automatic coffee maker with a coffee grinder.

5 Claims, 2 Drawing Sheets

COFFEE GRINDER WITH COFFEE BEAN CONTAINER

CROSS REFERENCE APPLICATIONS

This application claims priority from German application no. 203 00 933.9 filed Jan. 22, 2003.

FIELD OF INVENTION

The present invention relates to a coffee grinder with a coffee bean container divided to form two compartments, with an output shaft at the bottom common to both compartments. A grinding mill is placed beneath the output shaft. A closure element for the optional closing of the output of at least one of the compartments is provided. The invention further relates to an automatic coffee maker with a coffee grinder with a coffee bean container with a bottom-side output shaft and with the grinding mill disposed beneath the output shaft.

BACKGROUND OF THE INVENTION

DE 196 06 076 A1 discloses a coffee grinder comprising a coffee bean container with a bottom-side output shaft. The output shaft of the coffee bean container terminates in the input of a grinding mill. The coffee bean container itself is divided into two compartments, such that two different coffee varieties can be stored in it. In the lower region of the coffee bean container a guide cone is disposed, which serves for the lateral supply of the coffee beans into the output shaft. The coffee bean container also has a closure element, which is rotatably supported and which extends through the coffee bean container. The closure element is structured like a cup open toward the bottom. A shaft with a top-side knob is disposed at the top side of the cup. The shaft itself is supported in a tubular body extending through the coffee bean container. The closure element is partially open circumferentially. The closure element can be brought with its remaining sections in front of the lower output opening of a compartment in order to fill coffee beans optionally from the one compartment or coffee beans from the other compartment into the output shaft and to supply them to the grinding mill. Consequently, in this prior known coffee grinder, coffee beans of different varieties can be ground without first having to empty the coffee bean container.

Although in principle the functionality of this coffee grinder is given in the described manner, disadvantages can be encountered in handling the coffee grinder. For example, beans can block a rotational movement of the closure element so that an actuation of the closure element by turning the knob is only possible, if at all, by exerting a not inconsiderable force. Further, the structuring of the coffee bean container, and especially its cover, is restricted, since it is necessary to ensure in every case that the actuation members of the closure element—shaft and knob—are in their specified position. Consequently, the realization of a hinged lid is hardly possible.

Automatic coffee makers or fully automatic coffee makers include a coffee bean container for storing coffee beans. In such automatic coffee makers with each request for coffee, freshly ground coffee is used for the preparation of coffee. A grinding mill associated with the automatic coffee maker is responsible for making available the particular required quantity of ground coffee. The coffee bean container has a receptacle with an output shaft placed onto the input of the grinding mill. As a rule, the output shaft of the receptacle carries a guide cone, in order for the coffee beans to be supplied to the grinding mill. The receptacle is open at the bottom.

The coffee bean container is secured on the housing of the automatic coffee maker by means of a coupling ring, which can be secured in position on an appropriately conceptualized counterpieces, for example with a bayonet type lock.

The coffee bean container of such automatic coffee makers includes a container for receiving the coffee beans and a shaft disposed laterally with respect to it for supplying already ground coffee past the grinding mill, in order for it to be poured directly into the brewing chamber.

However, there is a wish to having available a coffee bean container with such automatic coffee makers that can store at least two different varieties of coffee beans.

Building on this discussed prior art, the invention addresses the problem of further developing a coffee grinder as well as an automatic coffee maker equipped therewith to the extent that the disadvantages listed in connection with the coffee grinder described in the introduction are at least to the greatest possible extent avoided.

This problem is solved when the closure element forms with the grinding mill a concrete unit and the coffee bean container is disposed rotatably relative to the unit formed of the closure element and the grinding mill.

SUMMARY OF THE INVENTION

The primary aspect of the present invention is to provide a coffee bean container for a coffee grinder and/or an automatic coffee machine which can have more than one section for storing different varieties of coffee. The coffee bean container can be rotated to change which type bean is supplied to the mill for grinding.

Other aspects of this invention will appear from the following description and appended claims, reference being made to the accompanying drawings forming a part of this specification wherein like reference characters designate corresponding parts in the several views.

According to the invention the coffee bean container is divided in to at least two compartments, with the compartments of the coffee bean container terminating in the output shaft. The automatic coffee maker has a closure element for the optional closing of the output of at least one compartment. The closure element forms with the grinding mill a concrete unit and the coffee bean container is disposed rotatably relative to the unit formed of the closure element and the grinding mill.

In such a coffee grinder the closure element is basically associated with the grinding mill. For this reason the coffee bean container itself does not need to include or support movable parts for driving the closure element. The closure element is placed on the grinding mill stationary against a rotational movement of the coffee bean container. In contrast, the coffee bean container itself is rotatably supported relative to the grinding mill between at least two end positions. The closure element partially covers the input of the grinding mill. The particular opening of a compartment for delivering coffee beans corresponds substantially to the contour of the space left free by the closure element.

Consequently by the rotation of the coffee bean container about its axis, the output opening of a compartment with the desired coffee bean variety can be brought into a disposition flush with the space not covered by the closure element, such that the coffee beans in this compartment can be supplied to the grinding mill. Of special advantage in this coffee grinder is that a change of variety is brought about by rotation of the coffee bean container. As a rule, it has a sufficiently large diameter such that even in the presence of coffee beans, any beans in the opening could readily be pressed to the side. The pivoting between the closure element and the particular output opening of a compartment can readily take place due to the large lever. In particular, the possibility exists of rotating the coffee bean container with both hands.

Only a minimal width movement gap is formed between the closure element and the particular output opening of the compartments of the coffee bean container. The inner width of the gap is markedly less than the average diameter of a coffee bean.

The closure element can be developed in the manner of a disk covering the upper input opening of the shaft of the grinding mill. In this case the coffee bean container does not include a guide cone, but rather the openings of the compartments are placed directly into the bottom of the coffee bean container.

However, another embodiment provides that the coffee bean container includes a guide element, for example a guide cone, for the supply of the coffee beans into the output shaft. In this case the closure element is adapted to the bottom-side contour of the guide element and is structured, for example in the form of a downwardly open cup.

Usefully the closure element is detachably held torsion-tight on the grinding mill so that the grinding mill is accessible at the top after the removal of the coffee bean container and the closure element. An embodiment in which the grinding mill comprises an upper shoulder on which the closure element rests is useful. The closure element can carry a radially projecting toe which engages a corresponding recess of the housing of the grinding mill to ensure a rotational decoupling from a rotational movement of the coffee bean container disposed above the grinding mill. The coffee bean container has at the bottom side an encircling collar encompassing the output shaft, which the housing of the grinding mill engages.

An automatic coffee maker equipped with such a coffee grinder consequently can store different coffee varieties. The coffee bean container of such an automatic coffee maker can be moved to the grinding mill in different rotational positions. It can also be provided that in one position already ground coffee powder can be filled into the brewing chamber of the automatic coffee maker through a lateral supply shaft past the grinding mill.

The compartmentalization of the coffee bean container can be realized through detachable walls, which can be set into corresponding grooves of the coffee bean container. In such an embodiment it is possible to fill the coffee grinder with only one single coffee bean variety when the partitioning walls are removed.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
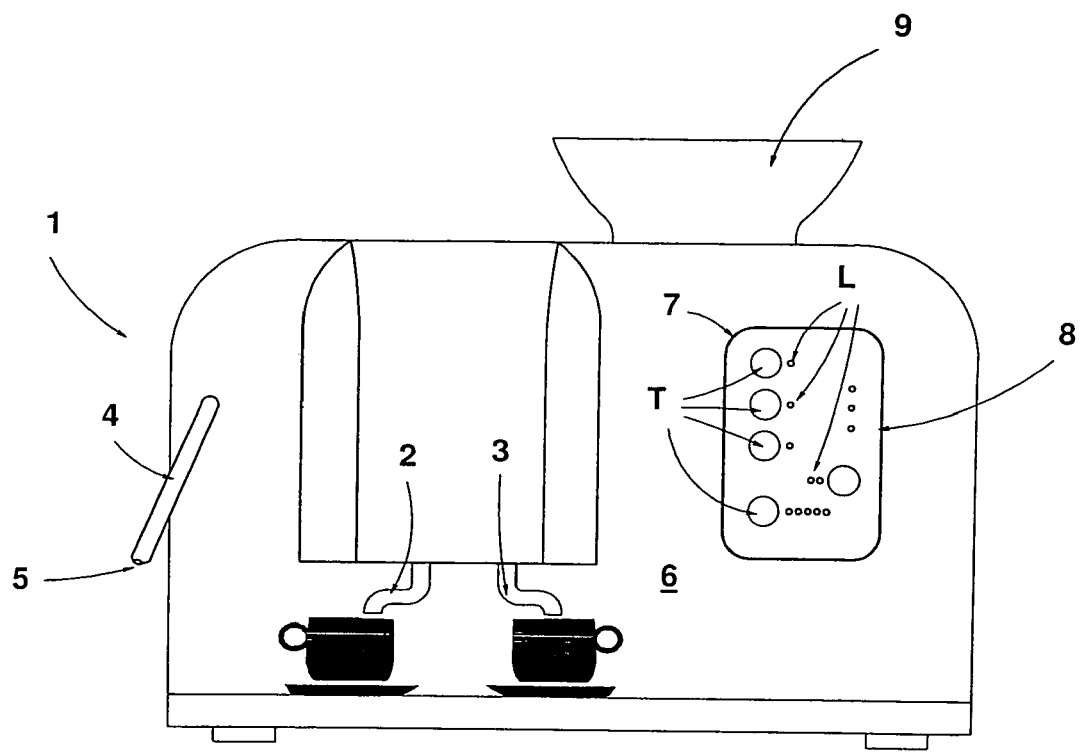
FIG. 1 is a schematic view of an automatic coffee maker with an integrated coffee grinder.

Referring to FIG. 1 a fully automatic coffee maker 1 is shown with two visible coffee outlets 2, 3 and a steam tube 4, with a steam nozzle 5 at the free. The housing 6 of the automatic coffee maker includes an operating panel 8 set into a recessed seating 7. The operating panel 8 comprises several buttons T as electric switches, with which the different functions of the automatic coffee maker 1 can be initiated. Several LEDs L serve as control display means for indicating that a specific button T has been actuated or as a selection indicator, if several different functions can be executed with one button T, or for indicating error functions.

In the housing 6 of the automatic coffee maker 1 has a grinding mill for grinding coffee beans. A coffee bean container 9 is associated with the automatic coffee maker 1 for the storage of coffee beans. The coffee bean container 9 is connected to the housing 6 of the automatic coffee maker 1 by a coupling ring. The coffee bean container 9 is placed onto a top-side opening of housing 6, beneath which the grinding mill 11 is positioned.

Figure 2:
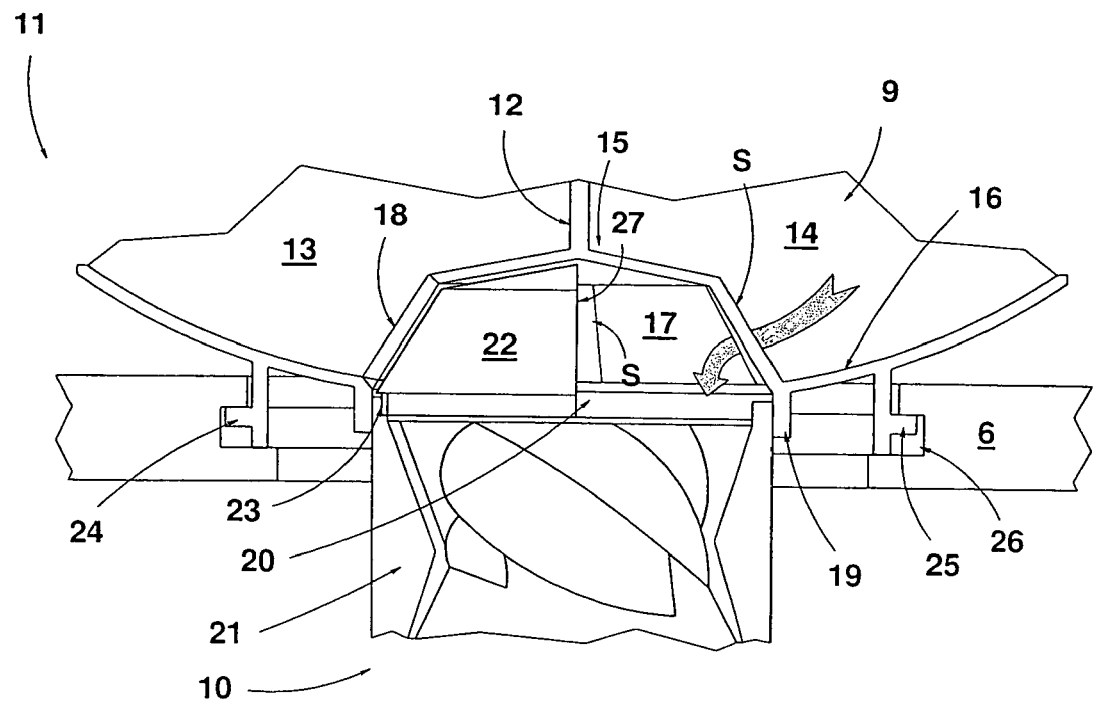
FIG. 2 is a sectional view through the coffee grinder of FIG. 1 in the region of the lower termination of: the coffee bean container in a first position.
Figure 3:
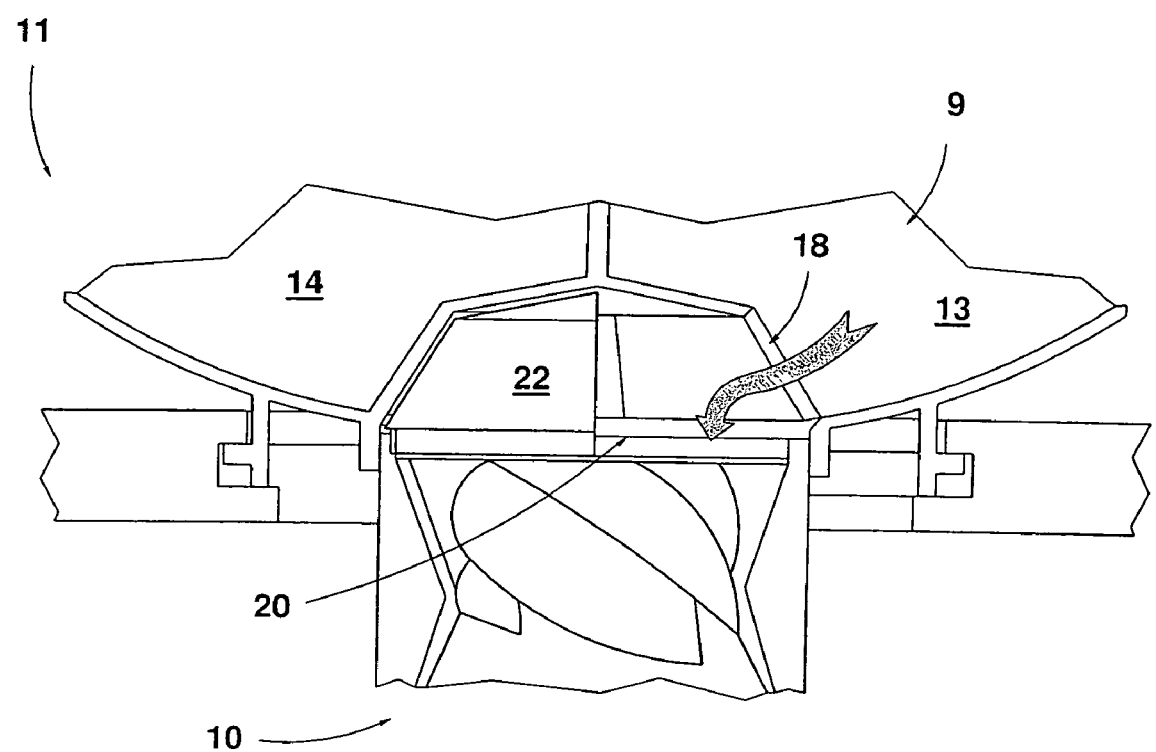
FIG. 3 is the configuration of FIG. 2 in a further position of the coffee bean container relative to the grinding mill.

Shown partially sectioned in FIG. 2, the automatic coffee maker 1 has a coffee grinder 11 formed of the coffee bean container 9 and a grinding mill 10. The coffee bean container 9 is divided into two compartments 13, 14 by a partitioning wall 12, so that in the coffee bean container 9 can store two different coffee bean varieties. A guide cone 15 is located in the lower region of the coffee bean container 9. The guide cone 15 is braced on the bottom 16 of the coffee bean container 9 by several walls S. Between the walls S of the guide cone 15 are several output openings. Two output openings 17, 18 are shown in FIG. 2 and FIG. 3. The disposition of the walls S and the output openings 17, 18 are formed so that the output opening 17, 18 terminates either in compartment 13 or compartment 14.

The bottom 16 of the coffee bean container 9 has a downwardly projecting encircling collar 19. The collar 19 and the walls S form an output shaft 20. The grinding mill 10 with its housing 21 engages the output shaft 20. The grinding mill 21 is fixedly mounted in the automatic coffee maker 1.

Associated with the grinding mill 10 is a closure element 22, whose formation corresponds to the contour of the underside of the guide cone 15. The closure element 22 in approximation is a segment of a fourth of a sphere in the depicted embodiment. The closure element 22 is set onto a shoulder in the region of the input of the grinding mill 10 and is connected by a toe 23 torsion-tight with the grinding mill 10.

The coffee bean container 9 is connected with the housing 6 of the automatic coffee maker 1 through a bayonet lock. FIG. 2 shows two bayonet toes 24, 25 associated with the coffee bean container 9 and one bayonet groove 26 provided as a part of the housing 6. As is evident in FIG. 2, the coffee bean container 9 is braced at the underside on the housing 6 of the coffee bean container. The coffee bean container 9 is rotatable about its vertical axis relative to the grinding mill 10 and the remaining components of the automatic coffee maker 9.

In the position of the coffee bean container 9 relative to the grinding mill 10 shown in FIG. 2, the output opening 17 is open. In this position the coffee beans in compartment 14 flow through the input of the grinding mill 10, as is indicated in FIG. 2 by the arrow symbolizing the flow of the coffee beans. Coffee beans contained in compartment 13 of the coffee bean container 9 cannot enter into the output shaft 20, since the output opening 18 is closed by closure element 22.

However, the coffee beans in compartment 13 can be introduced into the output shaft 20 and supplied to the grinding mill 10 if the coffee bean container is rotated by 180° into the other position. This is shown in FIG. 3. Since the closure element 22 is rotationally decoupled with respect to the rotational movement of the coffee bean container 9, it remains in its original position. The output opening 18 of compartment 13 subsequently assumes the position in which output opening 17 had been disposed. Consequently, now coffee can be brewed with the automatic coffee maker 1 using the coffee beans contained in compartment 13 of the coffee bean container 9 and which had been introduced via the output opening 18 of compartment 13 into the output shaft 20 and been supplied to the grinding mill 10.

The front side 27 delimiting the open side of the closure element 22 is usefully beveled and specifically toward the space encompassed by the closure element 22.

The description of the invention encompasses both a coffee grinder with simple means for the selection of different coffee varieties and an automatic coffee maker with such coffee grinder. The coffee bean container of such a coffee grinder can also comprise more than two compartments.

The different positions of the coffee bean container with respect to the grinding mill are usefully indicated haptically, for example by catching positions in order to indicate in this way when a user has reached a particular position. The coffee grinder can, in principle, be conceptualized such that a position change of the coffee bean container is detected at the side of the device, and that, after a change-over has occurred, the grinding mill is switched on for a short time in order to remove the remaining beans of the previously selected coffee variety from the grinding mill. The coffee meal produced during the grinding of these residual beans is usefully supplied to a separate container. When using such a coffee grinder as part of an automatic coffee maker, this coffee meal can be transferred into the refuse container for coffee grounds.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

List of Reference Symbols

| | |
|---|---|
| 1 | Coffee maker |
| 2 | Coffee outlet |
| 3 | coffee outlet |
| 4 | Steam tube |
| 5 | Steam nozzle |
| 6 | Housing |
| 7 | Recessed seating |
| 8 | Operating panel |
| 9 | Coffee bean container |
| 10 | Grinding mill |
| 11 | Coffee grinder |
| 12 | Partitioning wall |
| 13 | Compartment |
| 14 | Compartment |
| 15 | Guide cone |
| 16 | Bottom |
| 17 | Output opening |
| 18 | Output opening |
| 19 | Collar |
| 20 | Output shaft |
| 21 | Housing |
| 22 | Closure element |
| 23 | Toe |
| 24 | Bayonet toe |
| 25 | Bayonet toe |
| 26 | Bayonet groove |
| 27 | Front side |
| L | LED |
| S | Wall |
| T | Button |

I claim:

1. A coffee grinder comprising:
   a grinding mill having a housing with a top;
   said top having a stationary opening and having a circular receiving groove;
   said top having a stationary upper shoulder which forms a closure element over the stationary opening;
   a coffee bean container having a top and having a circular base collar sized to rotate in the circular receiving groove to a chosen rotational position relative to the closure element;
   said coffee bean container having a guide cone surrounding its bottom;
   said guide cone supporting at least one vertical dividing wall, thereby forming at least a first and a second coffee bean compartment;
   each of said coffee bean compartments having an opening at the bottom which conforms to the closure element;
   wherein coffee beans from the first coffee bean compartment fall through the stationary opening of the top of the grinding mill in a first rotational position of the circular base of the coffee bean container; and
   wherein coffee beans from the second coffee bean compartment fall through the stationary opening of the top of the grinding mill at second rotational position of the circular base of the coffee mean container.

2. The coffeemaker of claim 1, wherein the closure element has a shape of one fourth of a sphere which corresponds to the opening at the bottom of each coffee compartment.

3. The coffeemaker of claim 1, wherein the coffee bean container has a shape of a bowl.

4. The coffeemaker of claim 1, wherein the circular base collar further comprises a radially projecting toe which forms a rotating member of a bayonet lock into a locking groove of the grinding mill top, wherein the radially projecting toe is rotatable to a position to remove the coffee bean container from the grinding mill.

5. Coffee grinder as claimed in one of 1, 2, 3, or 4, further comprising an automatic coffee maker mounted beneath the grinding mill.

* * * * *